2,904,423

HERBICIDAL GRANULAR COMPOSITION AND METHOD OF PREPARING THE SAME

James D. Stone, Whittier, and Leonard M. Stahler, Pacific Palisades, Calif., assignors, by mesne assignments, to United States Borax & Chemical Corporation, a corporation of Nevada No Drawing. Application December 7, 1954
Serial No. 473,540

4 Claims. (Cl. 71—2.4)

This invention relates to methods for aggregating certain types of compositions and to the aggregated product. Many compositions which comprise dry mixtures of two or more granular ingredients are subject to segregation of the several ingredients, due to such factors as differences in specific gravity and differences in particle sizes. Whether the mixed compositions are finally applied and used in dry form, or in solution, segregation results in non-uniform proportions of the ingredients in actual use, making in certain instances for ineffectiveness and sometimes for dangerous hazard. And that is particularly a problem where, as in certain types of pesticides (herbicides, insecticides, fungicides and bactericides) the composition is distributed and applied in dry state. Many such compositions contain one or more ingredients that are relatively insoluble in water and hence impracticable to apply as a solution. And with many such pesticides it is further important that all of the ingredients be finally distributed and applied in substantially unvarying proportions because of the fact that one ingredient may have the effect of controlling the flammability of another, or have an action complementary to that of another, or may, as in the case of certain herbicides, have soil controlling properties which make another ingredient more effective or longer lived in its effectiveness.

The present invention is generally applicable to granular compositions made up of two or more ingredients, one of which is a granular non-deliquescent crystalline salt carrying less than its maximum amount of water of crystallization (hereinafter referred to as a water-deficient salt) and capable at ordinary atmospheric temperatures of fairly rapidly absorbing, and holding, water as water of crystallization thereby to supply all or part of the water deficiency. Such a water deficient salt is commonly but not necessarily inorganic.

In speaking of fairly rapid absorption of water, the rate at which sodium tetraborate pentahydrate absorbs water at ordinary temperatures may be taken as typical. Substances such as calcined gypsum, $CaSO_4$ (anhydrite) are so weak and slow in their water absorption that satisfactory aggregation is not obtainable with them in our processes. In other words, the water deficient and absorptive ingredient is hygroscopic but not deliquescent.

The other granular ingredient or ingredients may be insoluble or substantially so; it being a characteristic of the methods of this invention that it is effectively applicable to ingredients that are ordinarily regarded as insoluble. While the methods of the invention are operative on soluble ingredients, and the invention in its broader sense is not necessarily limited to an insoluble second ingredient, the methods have the specific desirable characteristic of being peculiarly well operative on insolubles. Since non-segregating aggregation of pesticidal compositions has particular utilities, we give, as illustrations but not as limitations on the invention, lists of typical pesticides to which our aggregating invention may be advantageously applied. The invention will be described in its typical application to a herbicide, but without any limitation thereto except as expressed in the following claims.

A water-deficient tetra-borate, for instance sodium tetraborate pentahydrate ($Na_2B_4O_7 \cdot 5H_2O$), may be taken as typical of the water deficient and water-absorptive crystal of the invention. Such a water-deficient borate as the pentahydrate is capable of taking up as much as five molecules of water per molecule of borate at ordinary atmospheric temperatures, so that a mixture which carries that amount of water, or less, becomes quite dry after the absorption. Such a water-deficient tetra-borate may be initially prepared either by driving water off from tetra-borate decahydrate $$(Na_2B_4O_7 \cdot 10H_2O)$$

with heat, or may in known manners be directly precipitated out of a solution as crystalline tetra-borate pentahydrate, that is borax containing only five molecules of water of crystallization. The method of the present invention starts with such a water-deficient crystal; and it is a feature of the method that it is carried out without any necessary use of heat, being thus much more economical than aggregating methods which require heat.

An organic herbicide of the hormone type, for instance 2–4 dichlorophenoxyacetic acid, referred to hereinafter as 2–4–D acid, may be taken as typical of another relatively insoluble ingredient which is desirably evenly distributed among and firmly attached to granules of the first ingredient to form a uniformly composed dry, free-flowing granular, and non-segregating herbicide. (Such a composition, regardless of the aggregation of the present invention is the subject matter of copending application Serial No. 394,902, filed November 27, 1953, by these applicants.) The 2–4–D acid here used as an illustrative ingredient to be aggregated with the first ingredient is relatively insoluble in water at ordinary temperatures and the granules of the 2–4–D acid go through the aggregating operations substantially unchanged in form and identity.

An effective and economical herbicide of the two above named ingredients is made up of from 2% to 18% of the second named and 98% to 82% of the first named ingredient. The method of the present invention is applicable however without limitation in the proportion of the ingredients; and without limitation as to the number of ingredients of each type, as hereinafter pointed out.

In practising the method of the present invention to aggregate the above named typical granular ingredients in such proportions as above, the following granular sizes are suitable; a granular size such that 90% or more passes through U.S. standard sieve No. 16, but is retained on U.S. standard sieve No. 100, has been found suitable for the water-deficient crystal, and substantially all passing through U.S. standard sieve No. 70 for the second ingredient.

Aggregation of the two or more granular ingredients, to form a dry, free-flowing granular mass in which the granules are composed of non-segregating aggregations of each of the ingredients in substantially the over-all proportions of the ingredients, is obtained in practise by either of the following simple procedures.

In the first of these procedures, the insoluble granular second ingredient is first thoroughly mixed with or evenly dispersed in a small amount of water, or merely thoroughly and evenly wetted with water. The total amount of water is in all cases not substantially more, and preferably in practise, less than the amount that can be taken up as water of crystallization by the water-deficient ingredient. For instance, for making up a typical composition of 95% of the borate and 5% of the 2–4–D acid, using the borate pentahydrate, for each pound of the acid 1.76 pounds of water may be used; that amount of water being less than the amount which the borate is capable of absorbing, corresponding to 1.5 molecules per molecule of the borate used.

The previously wetted second ingredient is then thoroughly mixed with the granular water-deficient ingredient at ordinary temperature. All, or substantially all, of the particles of the wetted second ingredient are then in contact, except perhaps for a thin separating water film, with granules of the water-deficient ingredient. The water-deficient ingredient then immediately takes up all or substantially all of the water as water of crystallization and the particles of the second insoluble ingredient become adhered to the crystalline granules. The final result is a product which is either completely or substantially superficially dry.

As indicated above, the amount of water is, with any such ingredients as here described, in all cases not substantially more, and preferably less, than the water deficiency of the crystal. And the amount of water is also subject to the following limitations; that in any case it should be at least equal to, and preferably somewhat more than, one mol water per mol of water deficient crystal, and not more than approximately two mols water per mol of the crystal. At least one mol water is necessary to achieve uniform aggregated distribution of the second ingredient throughout the granules of the crystal. And it has been found that, even where the water deficiency of the crystal is as much as five mols—as with the tetra-borate pentahydrate—the use of more than approximately two mols water results initially in a soggy mass and a final cakey mass rather than the desired mass of free flowing aggregated granules. Thus, in the example above, using a crystal having a water deficiency of five mols, we preferably use about 1.5 mols water per mol crystal. In the case of a crystal having a deficiency of only one mol water, compliance with both the limitations expressed above, requires the use of only one mol water. In the cases where the water deficiency of the crystal is greater than the water added, the initial mixing should be quite rapid, so as to get the water and the insoluble granules evenly distributed throughout the mass before any of the crystalline granules have time to absorb more than their share of the water. As an illustration in the example using tetra-borate pentahydrate, a mixing time of about six minutes is found effective.

Both of the above expressed limitations on the amount of water, apply not only to the first procedure above described, but also to the second procedure now described.

In the second procedure, the desired quantity of dry, granular, water-deficient crystal, for example the tetra-borate pentahydrate, is first thoroughly admixed with the second granular ingredient, for example 2,4,5-T acid, to thoroughly and uniformly disperse the second ingredient throughout the mass. Then the specified quantity of water is slowly added to the mass while the mixing agitation is continued. It is essential to this second procedure that the water be added in such manner as to be thoroughly distributed over and through the mass during agitation, for instance in a distributed fine spray, and at a rate substantially equal to the rate of absorption of the water by the crystal. Those two factors insure that the total water is evenly distributed among the crystalline granules and that the second ingredient is uniformly distributed in aggregated adherence to the crystalline granules.

As an example of this alternative procedure, 1000 pounds of borax pentahydrate is delivered to an 8 ft. ribbon mixer; 88 pounds of finely ground 2,4,5-T acid is added and the mass is mixed dry for 10 minutes. Desiring to add approximately 1½ mols water per mol of borax pentahydrate, or 92.68 pounds water per 1000 pounds borax pentahydrate, we use a fine spray nozzle system, operating at 50 p.s.i., to deliver the water uniformly over the mass of agitated material, for approximately 20 minutes. During the addition of this water the ribbon mixer is kept in operation. After the addition of water the mixer is operated for 5 to 10 minutes, then dumped, and the delivered aggregated product is dry, free of dust, and free flowing.

While both of the above described procedures are applicable generally to materials of the types here indicated, one or the other procedure may be more easily practicable in certain cases. For example, the second procedure is preferred in compositions including 2,4,5-T acid.

The result of either procedure is that the particles of the second ingredient are, in substantially uniform distribution throughout the whole mass, substantially all adhered to granules of the crystalline ingredient. If the second ingredient is granulated to a sufficiently small size relative to the first ingredient, the final product is made up of composite granules in which the first ingredient is more or less coated with the second. The particles of both ingredients go through the operation substantially unchanged as to identify and form and the final product is dry, granular and free flowing with substantially each composite granule made up of a granule of crystal and adhered particle or particles of the second component; the proportions of the components in each final composite granule being substantially the same as or at least approximating the proportions of the whole mass.

To facilitate and aid uniform distribution of the small amount of the second ingredient, wetting and spreading agents such as Santomerse No. 1, an alkyl aryl sulfonate, may be used in small amounts (about 0.1% of the second ingredient). Or inert solid carriers, such as pulverized talc, pyrophyllite or Bentonite may be mixed in with the second ingredient when the water is added to aid uniform dispersal.

And although we find that adherence of the second ingredient particles to the crystalline granules is usually sufficiently good to prevent segregation, the addition of a small amount of sticker, such for example as Armour Sticker, a blood albumin derivative, insures adherence. Where such a sticker is used it is mixed in an amount of about 0.1% of the second ingredient, when the water is added.

The method of the invention may be applied to compositions containing either one or more ingredients of each type; for instance, either one or more ingredients of the crystalline water-deficient type, and one or more ingredients desired to be aggregated with the crystal and each of which may be substantially insoluble. In such instances the amount of water used is not more than and preferably less than the amount which all of the water-deficient crystals are capable of absorbing as water of crystallization; and also between one and approximately two mols per mol of all the crystalline ingredients.

Illustrative and typical compositions to which the method of the present invention is applicable may be made up of one or more ingredients chosen from each of the following groups.

Group I

Crystalline salts which are water deficient and are capable at normal atmospheric temperatures, of rapidly taking up water as water of crystallization. These may have pesticidal properties. Compounds illustrative of this group are $Na_2B_4O_7$ with less than 10 mols water; $MgSO_4$ with less than 7 mols water; $Na_2SO_4$ with less than 10 mols water.

Group II (1) Herbicides:
  (a) 2,4-dichlorophenoxyacetic acid, hereinafter referred to as 2,4-D acid.
  (b) 2,4,5-trichlorophenoxyacetic acid.
  (c) 2-methyl-4-chlorophenoxyacetic acid.
  (d) 3-p-chlorophenyl-1-1-dimethylurea.
  (e) Phenyldimethylurea.

(2) Insecticides:
  (a) 1-1-1-trichloro-2-2-bis-(p-chlorophenyl) ethane.

(3) Fungicides:
   (a) $C_6Cl_4O_2$ (Spergon) and compounds such as hydroxy-mercuric-chlorophenol (Semesan).

This application is a continuation in part of our application Serial No. 403,472, filed January 11, 1954, now abandoned.

We claim:

1. The process for producing a dry, granular herbicidal composition consisting essentially of sodium borate and a substantially insoluble and highly active herbicidal material in mutually adhered and effectively non-segregable relation; said process comprising mixing together at ordinary temperature from about 82 to about 98 parts by weight of granular crystalline sodium tetraborate pentahydrate having a screen size predominantly coarser than about 100 mesh, from about 18 to about 2 parts by weight of a solid, granular, substantially water-insoluble and highly active herbicidal material having a screen size predominantly finer than about 70 mesh, and water in an amount between one and two molecules per molecule of the sodium tetraborate, and continuing to mix said ingredients at normal temperature to absorb the water in the granules of sodium tetraborate and to adhere the particles of herbicidal material thereto, the product resulting from said process being dry, granular, free-flowing and dust-free and being composed of mutually unattached granules of sodium tetraborate with substantially all the particles of said insoluble herbicidal material physically adhered in firm and effectively non-segregable relation thereto.

2. The process for producing a dry, granular herbicidal compositon consisting essentially of sodium borate and a substantially insoluble and highly active herbicidal material in mutually adhered and effectively non-segregable relation; said process comprising mixing together at ordinary temperature from about 82 to about 98 parts by weight of granular crystalline sodium tetraborate pentahydrate having a screen size predominantly coarser than about 100 mesh, from about 18 to about 2 parts by weight of a solid, granular, substantially water-insoluble herbicidal material selected from the class consisting of 2,4-dichlorophenoxyacetic acid, 2,4,5-trichlorophenoxyacetic acid, 2-methyl-4-chlorophenoxyacetic acid, 3-p-chlorophenyl-1-1-dimethylurea, and phenyldimethylurea, said herbicidal material having a screen size predominantly finer than about 70 mesh, and water in an amount between one and two molecules per molecule of the sodium tetraborate, and continuing to mix said ingredients at normal temperature to absorb the water in the granules of sodium tetraborate and to adhere the particles of herbicidal material thereto, the product resulting from said process being dry, granular, free-flowing and dust-free and being composed of mutually unattached granules of sodium tetraborate with substantially all the particles of said insoluble herbicidal material physically adhered in firm and effectively non-segregable relation thereto.

3. The method of producing a dry, granular herbicidal composition consisting essentially of sodium borate and a substantially insoluble and highly active herbicidal material in mutually adhered and effectively non-segregable relation; said method comprising mixing together in dry condition at ordinary temperature from about 82 to about 98 parts by weight of granular crystalline sodium tetraborate pentahydrate having a screen size predominantly coarser than about 100 mesh, from about 18 to about 2 parts by weight of a solid, granular, substantially water-insoluble herbicidal material selected from the class consisting of 2,4-dichlorophenoxyacetic acid, 2,4,5-trichlorophenoxyacetic acid, 2-methyl-4-chlorophenoxyacetic acid, 3-p-chlorophenyl-1-1-dimethylurea, and phenyldimethylurea, having a screen size predominantly finer than about 70 mesh, slowly adding to the said mixing ingredients water in the form of a fine spray and in an amount between about one and about two molecules of water per molecule of the sodium tetraborate, and continuing to mix said ingredients at normal temperature to absorb the water in the granules of sodium tetraborate and to adhere the particles of herbicidal material thereto, the product resulting from said process being dry, granular, free-flowing and dust-free and being composed of mutually unattached granules of sodium tetraborate with substantially all the particles of said insoluble herbicidal material physically adhered in firm and effectively non-segregable relation thereto.

4. A dry, granular, free-flowing and dust-free composition of matter for the control of vegetation composed of discrete and mutually unattached solid granules having a screen size predominantly between 16 and 100 mesh, substantially all of said discrete granules consisting essentially solely of crystalline sodium tetraborate containing on the average between about 6 and about 7 molecules of water per molecule of tetraborate, and a solid substantially water-insoluble herbicidal material selected from the class consisting of 2,4-dichlorophenoxyacetic acid, 2,4,5-trichlorophenoxyacetic acid, 2-methyl-4-chlorophenoxyacetic acid, 3-p-chlorophenyl-1-1-dimethylurea, and phenyldimethylurea, said herbicidal material being present in a ratio by weight of from 2 to 18% of herbicidal material to from 98 to 82% of sodium tetraborate, and being in the form of solid concentrated deposits of a size corresponding to a screen size predominantly finer than about 70 mesh, said deposits being physically adhered directly to the crystalline sodium tetraborate in firm and effectively non-segregable relation.

References Cited in the file of this patent

UNITED STATES PATENTS

| | | |
|---|---|---|
| 302,266 | Leibig et al. | July 22, 1884 |
| 1,721,803 | Carson | July 23, 1929 |
| 1,969,980 | Harvey | Aug. 14, 1934 |
| 2,536,456 | Miller | Jan. 2, 1951 |
| 2,700,604 | Knight | Jan. 25, 1955 |
| 2,709,648 | Ryker et al. | May 31, 1955 |